United States Patent [19]
Kawamura

[11] Patent Number: 4,769,568
[45] Date of Patent: Sep. 6, 1988

[54] RELUCTANCE ROTARY MACHINE

[75] Inventor: Hideo Kawamura, Samukawa, Japan

[73] Assignee: Isuzu Motors Ltd., Tokyo, Japan

[21] Appl. No.: 127,523

[22] Filed: Dec. 1, 1987

Related U.S. Application Data

[63] Continuation of Ser. No. 712,439, Mar. 18, 1985.

[30] Foreign Application Priority Data

Mar. 17, 1984 [JP] Japan .................................. 59-51560
Mar. 17, 1984 [JP] Japan .................................. 59-51561

[51] Int. Cl.$^4$ ........................................ H02K 21/12
[52] U.S. Cl. ...................................... 310/156; 310/43; 310/261
[58] Field of Search ............... 310/152, 112, 168, 261, 310/265, 40 MM, 264, 169, 170, 75 R, 43, 45, 162, 163, 164, 269, 216, 217, 218; 290/52, 54

[56] References Cited

U.S. PATENT DOCUMENTS

| | | | |
|---|---|---|---|
| 2,299,589 | 10/1942 | Reis | 310/156 |
| 2,306,360 | 12/1942 | Stuart | 310/156 |
| 2,488,729 | 11/1949 | Kooyman | 310/156 |
| 3,012,161 | 12/1961 | Puder | 310/261 |
| 3,740,630 | 6/1973 | Jarret et al. | |
| 3,968,390 | 7/1976 | Yasuda | 310/156 |
| 4,289,989 | 9/1981 | Schibline | 310/261 |
| 4,363,988 | 12/1982 | Kliman | 310/216 |
| 4,433,261 | 2/1984 | Nashiki | 310/156 |

FOREIGN PATENT DOCUMENTS

| | | |
|---|---|---|
| 0141634 | 5/1985 | European Pat. Off. |
| 479238 | 7/1929 | Fed. Rep. of Germany |
| 2047108 | 3/1972 | Fed. Rep. of Germany |
| 2075586 | 9/1971 | France |
| 2185884 | 4/1974 | France |
| 2224912 | 10/1974 | France |
| 1228756 | 4/1971 | United Kingdom |

OTHER PUBLICATIONS

Office National de la Propriété Industrielle, (Thomas--Houston) 520,856, pp. 1–8, Figs. 1–12.
Ministrére; de l'Industrie, (Compagnie Generale d'Electricite) 76,069 pp. 1–2, Figs. 1–3.
Germany, Federal Republic of, Mullner, 731,484, p. 1 Fig. 1.
European Search Report, The Hague, 2/25/86, Examiner: K. H. Tio.

*Primary Examiner*—R. Skudy
*Attorney, Agent, or Firm*—Staas & Halsey

[57] ABSTRACT

A reluctance rotary machine is disclosed including stator coils having a winding phase for being supplied with a 90°-leading armature current to generate a no-load induced electromotive force, and a substantially I-shaped rotor disposed in the stator coils and having an extremely small magnetic reluctance in a first direction normal to a rotational axis and a large magnetic reluctance in a second direction normal to the first direction. The substantially I-shaped rotor is constructed of silicon steel having a small magnetic reluctance.

13 Claims, 4 Drawing Sheets

RELUCTANCE ROTARY MACHINE

This is a continuation of co-pending application Ser. No. 712,439, filed on 3/18/85, now abandoned.

BACKGROUND OF THE INVENTION

The present invention relates to a reluctance rotary machine and, more particularly, to a reluctance rotary machine coupled to an exhaust gas turbine of an internal combustion engine, for example.

There has heretofore been an attempt to drive a generator with an exhaust-gas turbine installed on an internal combustion engine to generate electric power for use as a power supply for various loads in an automobile.

The generator used in such an arrangement is generally of the induction type in which no current is passed through the rotor. The reason for using induction generator is that with a general synchronous generator, there are employed a rotor with coils and brushes interposed between the rotor and a field current supply for supplying current to the rotor coils from a fixed side, and the brushes would fail to be sufficiently strong mechanically on high-speed rotation of the rotor and would be worn or broken so that no electric power could be picked up.

The induction generator is, however, suitable for high-speed rotation as no current is passed through the rotor, and is effective for use as a generator which operates at several tens of thousands revolutions per minute.

With the induction generator, especially with a squirrel-cage rotor which lends itself to high-speed rotation, however, the rotor is of an integral construction including secondary conductors and short-circuit rings connecting the ends of the second conductors, the secondary conductors and the short-circuit rings being formed by casting aluminum in an iron core. On high-speed rotation, the rotor is subjected to undue centrifugal forces acting on the entire circumference thereof to cause the secondary conductors to gradually detach from the iron core and the short-circuit rings until finally the rotor is destroyed.

SUMMARY OF THE INVENTION

It is an object of the present invention to provide a reluctance rotary machine having a rotor which is of a stable mechanical strength against rotation at ultrahigh speeds.

Another object of the present invention is to provide a reluctance rotary machine which is compact in size and light in weight.

Still another object of the present invention is to provide a reluctance rotary machine with desired magnetic characteristics and no windage loss.

According to the present invention, there is provided a reluctance rotary machine comprising stator coils including a winding phase for being supplied with a 90°-leading armature current to generate a no-load induced electromotive force, and a substantially I-shaped rotor disposed in the stator coils and having an extremely small magnetic reluctance in a first direction normal to the rotational axis of the rotor and a large magnetic reluctance in a second direction normal to the first direction, the substantially I-shaped rotor being constructed of silicon steel having a small magnetic reluctance.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

The principles of a reluctance generator according to the present invention will first be described, and then preferred embodiments of generators constructed on those principles will be described.

Figure 1A:
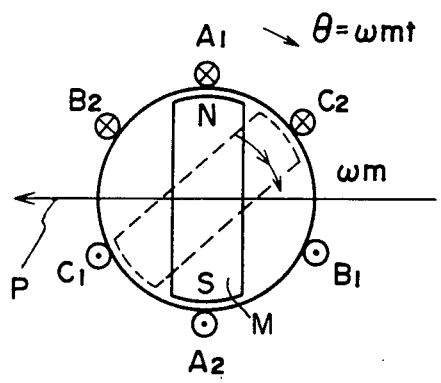
FIGS. 1a and 1b are diagrammatic views illustrative of the principles of a three-phase synchronous generator.
Figure 1B:
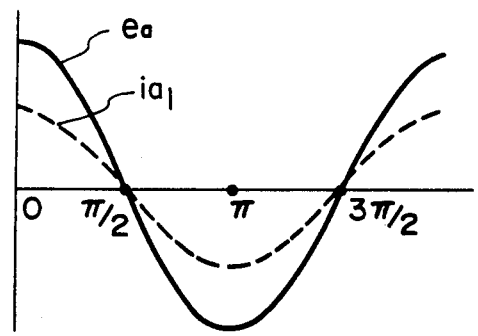

FIGS. 1a and 1b show the principles of a three-phase synchronous generator and the waveshape of an electromotive force induced, respectively. An I-shaped rotor M composed of a permanent magnet is rotatable in phase coils $A_1$–$A_2$, $B_1$–$B_2$, and $C_1$–$C_2$. When the rotor M is in the illustrated position, electromotive forces induced in the coils are directed as shown in FIG. 1a, and at this time the electromotive force ea in the coil $A_1$–$A_2$ is maximum.

When a load is put on the generator and an armature current $i_{a1}$ flows in phase with the electromotive force ea, the current in an armature winding coincides with the electromotive force distribution shown in FIG. 1b at $\theta = 0$, since the current and voltage in each phase are held in phase with each other. The armature current generates a magnetomotive force across the gap in the direction of the arrow P in FIG. 1a.

Thus, if the electromotive force ea and the armature current $i_{a1}$ are in phase with each other, then the magnetomotive force is generated by the armature current and lags a magnetic flux produced by the field coils by a phase angle of 90°.

Therefore, when currents $i_{a2}$, $i_{b2}$, $i_{c2}$ (FIG. 2b) are passed which lead the no-load induced electromotive force ea by 90°, the current $i_{a2}$ leading the electromotive force ea by 90° flows through the coil $A_1$–$A_2$, and the magnetomotive force due to the current $i_{a2}$ falls to zero at $\theta=0$. However, a magnetomotive force is generated by the currents $i_{b2}$, $i_{c2}$ in the direction of the arrow Q (FIG. 2a) which is the same direction as that of the field flux, thereby increasing the field flux.

Figure 2A:
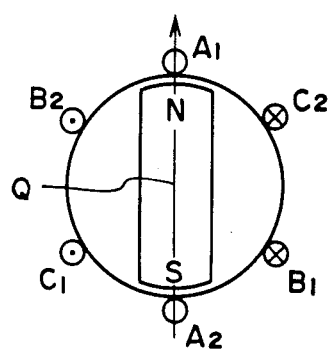
FIGS. 2a and 2b are diagrammatic views illustrative of the principles of a reluctance generator according to the present invention.
Figure 2B:
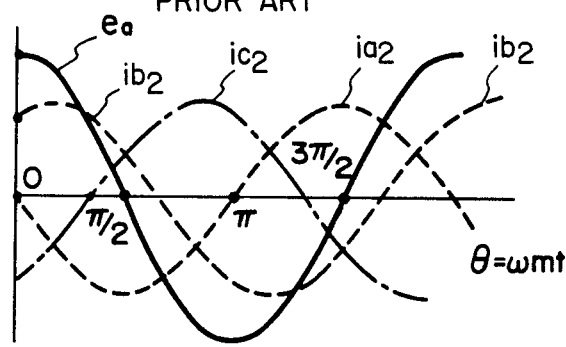

As a result, the process of generating currents leading the no-load induced electromotive force by 90° at all times and continuously changing the magnitudes of the currents is equivalent to an ordinary process of regulating the field current in the synchronous generator, as shown in FIG. 2a. It follows that a generator having the same function as the synchronous generator can be achieved without field coils and a permanent magnet. Such a generator has a reduced power factor as both load and field currents have to be passed through the armature coils.

Figure 3:
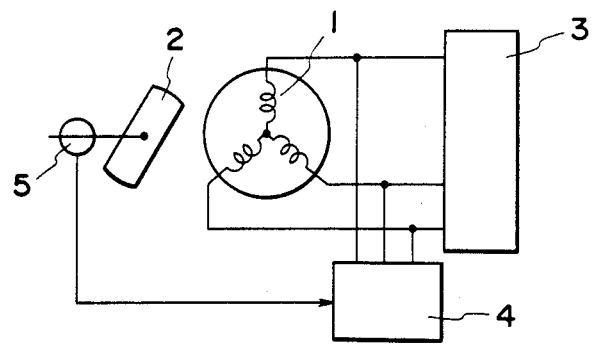
FIG. 3 is a diagrammatic view of a control circuit for a three-phase synchronous generator.

FIG. 3 shows a control circuit for the reluctance generator. Designated at 1 are armature coils of the generator, 2 a rotor, 3 a load, 4 a source of leading-phase reactive power, and 5 a rotor position sensor for detecting the angular position of the rotor 2 at all times and enabling the source 4 to supply excitation currents to the armature coils 1. When the rotor 2 is rotated, electromotive forces are induced in the armature coils 1 to supply electric power to the load 3. The source 4 may comprise a simple circuit employing a capacitor or may comprise a computer for adjusting phase angles to small degrees dependent on the operating conditions of the generator.

Figure 4:
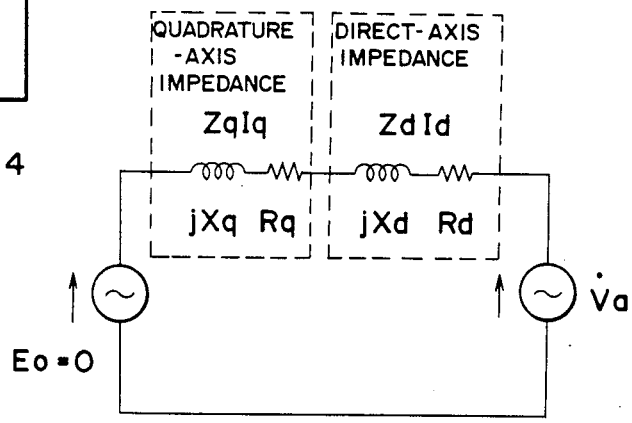
FIG. 4 is an equivalent circuit diagrammatic view of a reluctance generator.

As is apparent from the above principles of operation, the reluctance generator is the same as an ordinary salient-pole synchronous generator from which the field winding has been removed. The reluctance generator has an equivalent circuit as shown in FIG. 4 in which an electromotive force $E_0$ generated by a main flux due to the field winding in the salient-pole generator is zero.

Now, an analysis will be made to determine how the generator output is affected by Xq, Xd where the counterelectromotive force generated by connection to the load 3 is indicated by Va. For simplifying the analysis of operation of the generator, winding resistances Rq, Rd are neglected, and a quadrature-axis impedance Zq is regarded as being equal to jXq while a direct-axis impedance Zd is regarded as being equal to jXd. The vector diagram as shown in FIG. 5 is then plotted.

Figure 5:
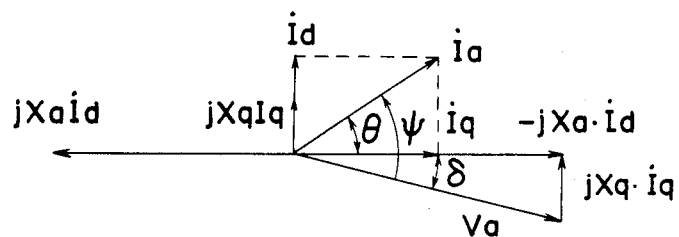
FIG. 5 is a diagrammatic view of voltage and current vectors in the equivalent circuit of the reluctance generator shown in FIG. 4.

In FIG. 5, $$Ia \cdot \cos\theta = Iq \quad (1)$$

$$Ia \cdot \sin\theta = Id \quad (2)$$

$$Va \cdot \cos\delta = Xd \cdot Id \quad (3)$$

$$Va \cdot \sin\delta = Xq \cdot Iq \quad (4)$$

One-phase output Pph is given by:

$$Pph = Va \cdot Ia \cdot \cos\psi \quad (5)$$
$$= Va \cdot Ia \cdot \cos(\theta + \delta)$$

By modifying the equation (5), $$Pph = \tfrac{1}{2}(1-\alpha)Xd \cdot Ia^2 \sin 2\theta \quad (6)$$

With $\alpha = Xq/Xd$, and by modifying the equation (6) based on the equations (1) through (4), $$Va = Xd \cdot Ia \sqrt{\sin^2\theta + \alpha^2 \cos^2\theta} \quad (7)$$

The one-phase output Pph then becomes:

$$Pph = \frac{(1-\alpha)\sin^2}{2\sqrt{\sin^2\theta + \alpha^2\cos^2\theta}} Va \cdot Ia = K_1 Va \cdot Ia \quad (8)$$

In order to increase the output Pph, Xd should be increased to as large an extent as possible and Xq should be reduced to as small an extent as possible, since Ia is an allowable current for the coils and can be suppressed, in view of the equation (6).

Figure 6A:
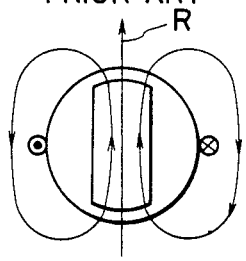
FIGS. 6a and 6b are diagrammatic views showing the relationship between angular positions of a rotor and a winding axis.
Figure 6B:
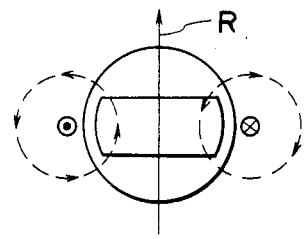

Thus, when the angular position of the rotor coincides with the direction of the coil axis as shown in FIG. 6a, then the magnetic flux generated by the coil passes in the direction of the solid-line arrow R, so that the magnetic path has a small magnetic reluctance and the coil has an increased self-inductance $L_1$. WHen the angular position of the rotor is normal to the coil axis as illustrated in FIG. 6b, then the magnetic path has a large magnetic reluctance and the coil has a reduced inductance $L_2$. Therefore, $$Xd = 3/2 \cdot \omega L_1 \quad (9)$$

$$Xq = 3/2 \cdot \omega L_2 \quad (10)$$

Figure 7:
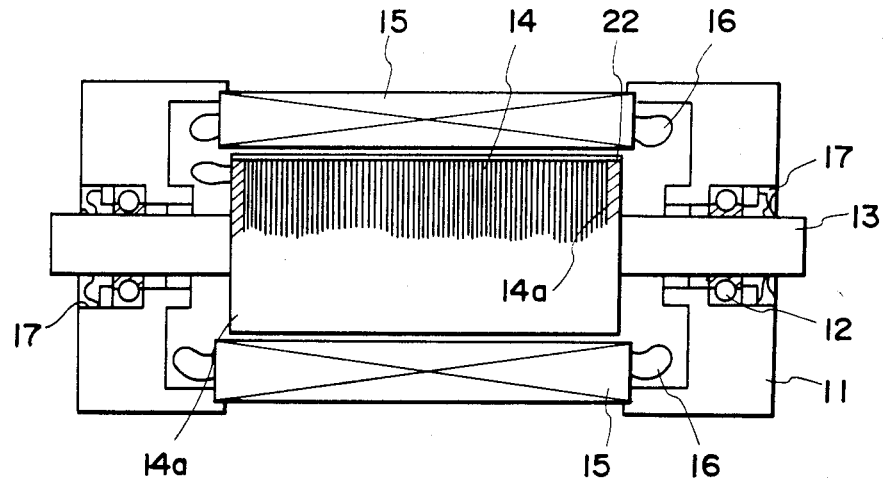
FIG. 7 is a longitudinal, cross-sectional view of a reluctance generator according to the present invention.
Figure 8:
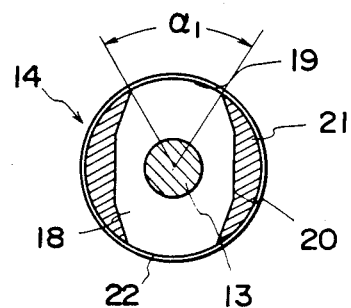
FIG. 8 is a transverse, cross-sectional view of a rotor according to the present invention.

FIGS. 7 and 8 illustrate a reluctance generator constructed on the basis of the above principles. The rotor in the reluctance generator should preferably be shaped such that $\alpha$ is reduced if the magnetic reluctance is small in the direction of a d-axis and large in the direction of a q-axis.

A shaft 13 is rotatably supported at its opposite ends by bearings 12 in a structural body or housing 11, and a rotor 14 is mounted on the shaft 13. Stator cores 15 and stator coils 16 are mounted on the housing 11 radially outwardly of the rotor 14. Designated at 17 are seal rings.

The rotor 14 has a circumference and comprises a laminated core 18 composed of silicon-steel sheets that are substantially I-shaped in accordance with intersecting cords of the circumference of the rotor 14 as shown in FIG. 8. The rotor 14 exhibits strong magnetism in the direction of a longer diameter and weak magnetism in the direction of a shorter diameter. With this arrangement, the magnetic reluctance is small in the longer-diameter direction and large in the shorter-diameter direction, with the result that the value of $\alpha$ is small and the output Pph is sufficiently large.

The substantially I-shaped laminated core 18 has a pair of diametrically opposite arcuate portions 19 in which $\alpha_1 = 90°$. The core 18 has a thickness, near the shaft 13, which is substantially the same as that of the arcuate portions 19. This dimension is employed to prevent the flux path from being narrowed by the shaft 13 and hence prevent the magnetic reluctance from being increased. The core 18 is held together by retainer plates 14a at its opposite ends.

The core 18 also includes a nonarcuate portion 20 between the arcuate portions 19. Dummy fillers 21 are joined to the nonarcuate portions 20 and present arcuate surfaces which smoothly blend into the arcuate portions 19 to form the remaining part of the circumference of the rotor as shown in FIG. 8. The dummy fillers 21 are formed of hard synthetic resin.

The entire outer circumferential surface of the core 18 is covered with a nonmagnetic metal sheet 22 made of, e.g., stainless steel or an alloy of titanium. The sheet 22 provides a smooth outer circular surface for preventing windage loss, separation of the fillers 21 and flexing of the core 18 under centrifugal forces applied to the core 18. The clearance between the stator cores 15 and the shaft 13 should preferably be as small as possible. At least the thickness of the fillers 21 in the longer-diameter direction should preferably be as small as possible in order to produce the difference between the magnetic reluctances referred to above.

With the reluctance generator of the above construction, it is not necessary to extract an electromotive force from the rotating component, and the generator can rotate at ultra-high speeds without having to increase the mass of the rotor, unlike the conventional induction generator.

Since a sufficiently large electric power can be generated by the ultra-high speed rotation, the produced power can be utilized by an automotive load by driving the generator with the exhaust-gas turbine, for example, of an internal combustion engine.

While the rotor 14 is shown as being composed of sheets of silicon steel, it may comprise a silicon-steel block having a substantially I-shaped cross section and exhibiting strong magnetism in the direction of a longer diameter and weak magnetism in the direction of a shorter diameter. The desired object can be achieved to a certain degree by constructing the rotor 14 of a soft-iron block.

Figure 9:
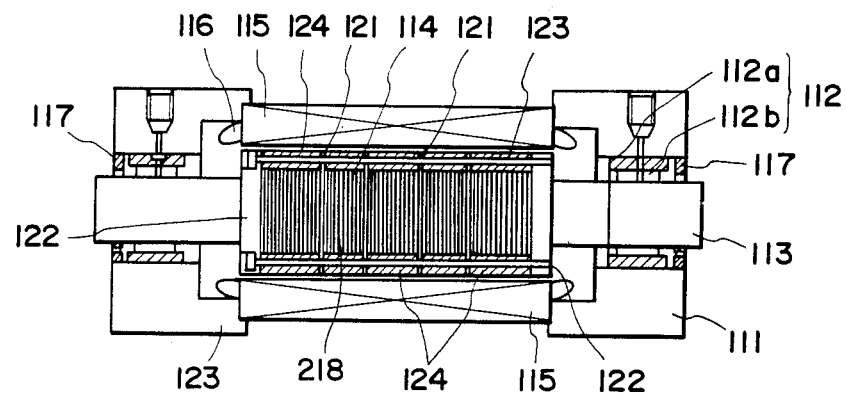
FIG. 9 is a longitudinal, cross-sectional view of a reluctance generator according to another embodiment of the present invention.
Figure 10:
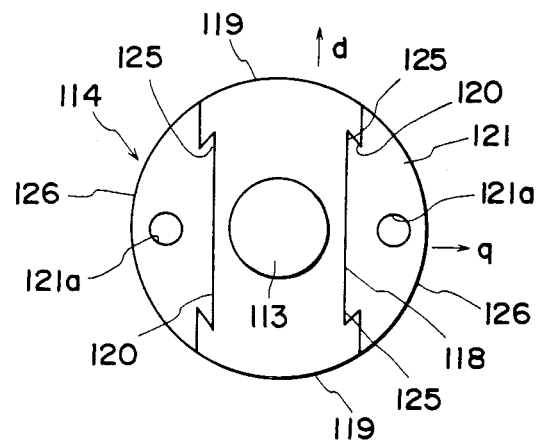
FIG. 10 is a transverse, cross-sectional view of a rotor according to another embodiment of the present invention.

A specific arrangement of a generator device employing a reluctance generator and a rotor of another embodiment will be described with reference to FIGS. 9 and 10.

A shaft 113 is rotatably supported at its opposite ends by bearings 112 in a housing 111, and a rotor 114 is mounted on the shaft 113. Stator cores 115 and stator coils 116 are disposed on the housing 111 radially outwardly of the rotor 114. Denoted at 117 are seal rings.

Each of the bearings 112 is composed of a fixed bearing 112a attached to the housing 111 and a floating bearing 112b rotatable with respect to the fixed bearing 112a and the shaft 113.

The rotor 114 has a laminated core 218 composed of a number, each having silicon-steel sheets of a substantially I shape. As shown in FIG. 10, the rotor 114 has nonarcuate portions 118 and arcuate portions 119, and the nonarcuate portions 118 have wedge-shaped grooves 120 serving as locking recesses in which portions of dummy fillers 124, described later, are fitted. The rotor 114 exhibits strong magnetism in the direction of the longer diameter and weak magnetism in the direction of the shorter diameter. Stated otherwise, the magnetic reluctance is small in the longer-diameter direction and large in the shorter-diameter direction, with the result that the value of α is small and the output Pph is sufficiently large.

Between the silicon-steel sheets constituting the rotor 114, there are interposed a plurality of silicon-steel disks 121 having outer peripheral edges coinciding with the outer peripheral edges of the arcuate portions 119. The silicon-steel disks 121, therefore, project radially outwardly of the nonarcuate portions 118, as shown in FIG. 10, with bolt insertion holes 121a defined in the radially outwardly projecting portions of the disks 121.

The rotor 114 is held at its opposite ends by a pair of retainer plates 122 interconnected by bolts 123 which are fastened to keep the rotor 114 retained between the retainer plates 122. The bolts 123 are inserted through the bolt insertion holes 121a in the silicon-steel disks 121 to hold the silicon-steel disks 121 and the retainer plates 122 as an integrally joined construction. The rotor 114 thus constructed is fastened to the shaft 113 in any known manner.

Resin plates 124 serving as dummy fillers are interposed on the outer peripheral edges of the nonarcuate portions 118 between the retainer plates 122 and the silicon-steel disks 121 and also between the adjacent silicon-steel disks 121. The resin plates 124 have on inner ends thereof wedge-shaped projections 125 that are fitted in and dovetail with the wedge-shaped grooves 120 as shown in FIG. 10. The interfitting engagement between the projections 125 and the grooves 120 completely prevents the resin plates 124 from being detached in the radially outward direction. The resin plates 124 have outer peripheral surfaces smoothly blending into the outer peripheral surfaces of the arcuate portions 119, thus providing an arcuate surface 126 forming a substantially true circle about the circumference of the rotor as shown in FIG. 10.

The resin plates 124 may be formed by pouring molten resin between the retainer plates 122 and the silicon-steel disks 121. With this arrangement, the resin plates 124 can be united with the rotor 114 more completely, and it is easy to provide the rotor 114 with a smooth outer peripheral surface which reduces windage loss.

The bolts 123 are made of a titanium alloy or carbon fibers which are lightweight and very strong against centrifugal forces.

With the reluctance generator of the above construction, the magnetic path in the d-axis direction of the rotor has a small magnetic reluctance and the magnetic path in the q-axis direction has a large magnetic reluctance, thus allowing a sufficient electric output Pph to be generated. No electromotive force is to be extracted from the rotating component, and the mass of the rotor is not required to be large, unlike the conventional induction generator.

Since the resin plates 124 are wedged into the silicon-steel sheets, the resin plates 124 are prevented from being detached radially outwardly under centrifugal forces applied. The outer peripheral surfaces of the resin plates 124 are shaped as arcuate surfaces matching those of the silicon-steel plates 121 and smoothly blend into the outer peripheral surfaces of the arcuate portions 119. Therefore, the outer peripheral surface of the rotor 114 is void of portions subjected to wind, and the wind resistance against the rotation of the rotor 114 is reduced.

The bolts 123 mounted on the retainer plates 122 are effective in preventing the resin plates 124 and the silicon-steel disks 121 from being detached under centrifugal forces applied.

With the foregoing rotor construction, the rotor 114 will not undergo large vibrations or damage even when it is driven to rotate at 50,000 rpm, and can generate a high electric power output with only a small windage loss.

Although the rotor 114 is illustrated as being composed of silicon-steel sheets, the rotor 114 may comprise a silicon-steel block having a substantially I-shape and having a smaller magnetic reluctance in the longer-diameter direction and a larger magnetic reluctance in the shorter-diameter direction.

The reluctance rotary machine according to the present invention can be used as a reluctance motor.

Although certain preferred embodiments have been shown and described, it should be understood that many changes and modifications mauy be made thereto without departing from the scope of the appended claims.

What we claim is:

1. A reluctance rotary machine comprising:
   a structural body;
   a shaft rotatably supported by said structural body;
   a rotor having a circular circumference and a substantially I-shaped solid cross section with opposing arcuate portions forming part of the circumference of said rotor and opposing wedge shaped nonarcuate portions each having an outer shape defined by intersecting chords of the circumference, said rotor being constructed of a silicon-steel material and having a magnetic reluctance in a first direction normal to an axis of said shaft smaller than a magnetic reluctance in a second direction normal to said first direction and to the axis of said shaft, said rotor having a thickness in the first direction being substantially the same as that of said arcuate portions in the first direction;
   dummy fillers having arcuate portions forming the remaining portion of the circumference of said rotor and nonarcuate portions shaped to fit said nonarcuate portions of said rotor;
   stator coils disposed around said rotor; and
   a source of leading-phase reactive power for supplying the stator coils with excitation currents.

2. A reluctance rotary machine according to claim 1, wherein said silicon-steel material making up the I-shaped rotor includes a lamination of silicon-steel sheets.

3. A reluctance rotary machine according to claim 1, wherein said silicon-steel material making up the I-shaped rotor includes a silicon-steel block.

4. A reluctance rotary machine according to claim 1, further comprising:
   a nonmagnetic metal sheet covering an entire outer circumferential surface of said rotor, including said arcuate surfaces.

5. A reluctance rotary machine according to claim 1, wherein said rotor comprises a plurality of laminated silicon-steel sheets.

6. A reluctance rotary machine according to claim 1, wherein said rotor comprises a silicon-steel block.

7. A reluctance rotary machine according to claim 1, wherein said reluctance rotary machine is supplied with an electric power so as to operate as a motor.

8. A reluctance rotary machine according to claim 1, wherein a torque is applied to the rotatable shaft of the reluctance rotary machine to operate the same as a generator.

9. A reluctance rotary machine, comprising:
   a structural body;
   a shaft rotatably supported by said structural body;
   a rotor having a circular circumference and a substantially I-shaped solid cross section with arcuate portions and nonarcuate portions, and having a magnetic reluctance in a first direction normal to an axis of said shaft smaller than a magnetic reluctance in a second direction normal to said first direction and to the axis of said shaft, said rotor having a thickness in the first direction across said nonarcuate portions being substantially the same as a thickness of said arcuate portions in the first direction;
   dummy fillers having arcuate portions forming the remaining portion of the circumference of said rotor and wedge-shaped projections fitted to dovetail with said nonarcuate portions of said rotor; and
   stator cores and coils disposed around said rotor.

10. The reluctance rotary machine as recited in claim 9, wherein the rotor is constructed of a silicon-steel material.

11. A reluctance rotary machine according to claim 10, wherein the silicon-steel material making up the I-shaped rotor includes a lamination of silicon-steel sheets.

12. A reluctance rotary machine according to claim 10, wherein the silicon steel material making up the I-shaped rotor includes a silicon-steel block.

13. A reluctance rotary machine according to claim 9, wherein the rotor includes a soft-iron block.

* * * * *